United States Patent
Wu et al.

(10) Patent No.: US 12,283,994 B2
(45) Date of Patent: Apr. 22, 2025

(54) APPARATUS, METHOD, AND SYSTEM FOR PERFORMING ERROR CORRECTION BASED ON LASER POWER SETTING

(71) Applicant: Intel Corporation, Santa Clara, CA (US)

(72) Inventors: Zuoguo Wu, San Jose, CA (US); Ling Liao, Santa Clara, CA (US); David Hui, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 17/304,556

(22) Filed: Jun. 23, 2021

(65) Prior Publication Data

US 2021/0320722 A1 Oct. 14, 2021

(51) Int. Cl.
H04B 10/50 (2013.01)
H04B 10/40 (2013.01)
H04B 10/61 (2013.01)

(52) U.S. Cl.
CPC ........... H04B 10/503 (2013.01); H04B 10/40 (2013.01); H04B 10/6165 (2013.01)

(58) Field of Classification Search
CPC .. H04B 10/503; H04B 10/40; H04B 10/6165; H04B 10/118; H04B 7/18513; H04B 10/2507; H04B 10/60; H04B 10/50; H04J 14/02; H04J 14/0201
See application file for complete search history.

(56) References Cited

U.S. PATENT DOCUMENTS

| | | | | |
|---|---|---|---|---|
| 2009/0169015 | A1* | 7/2009 | Watanabe | H04L 9/0858 380/278 |
| 2016/0204865 | A1* | 7/2016 | Boroson | H04B 10/40 398/97 |
| 2020/0280369 | A1* | 9/2020 | Huang | H04B 10/25133 |
| 2022/0303009 | A1* | 9/2022 | Boroson | H04L 1/1835 |

* cited by examiner

*Primary Examiner* — Hibret A Woldekidan
(74) *Attorney, Agent, or Firm* — Essential Patents Group, LLP

(57) ABSTRACT

In one embodiment, an apparatus includes a processor, a laser, and a modulator. The processor is to generate a first electrical signal including first data and a second electrical signal including second data. The laser is to generate a multiplexed carrier signal comprising a first carrier signal and a second carrier signal, the laser to operate at a first laser power setting. The modulator is to generate a multiplexed optical signal including a first optical signal based in part on the first electrical signal and the first carrier signal and a second optical signal based in part on the second electrical signal and the second carrier signal. The apparatus is to transmit the multiplexed optical signal to a device and to retransmit the first data from the apparatus to the device based on a detection of error in a received version of the first data at the device. Other embodiments are described and claimed.

20 Claims, 10 Drawing Sheets

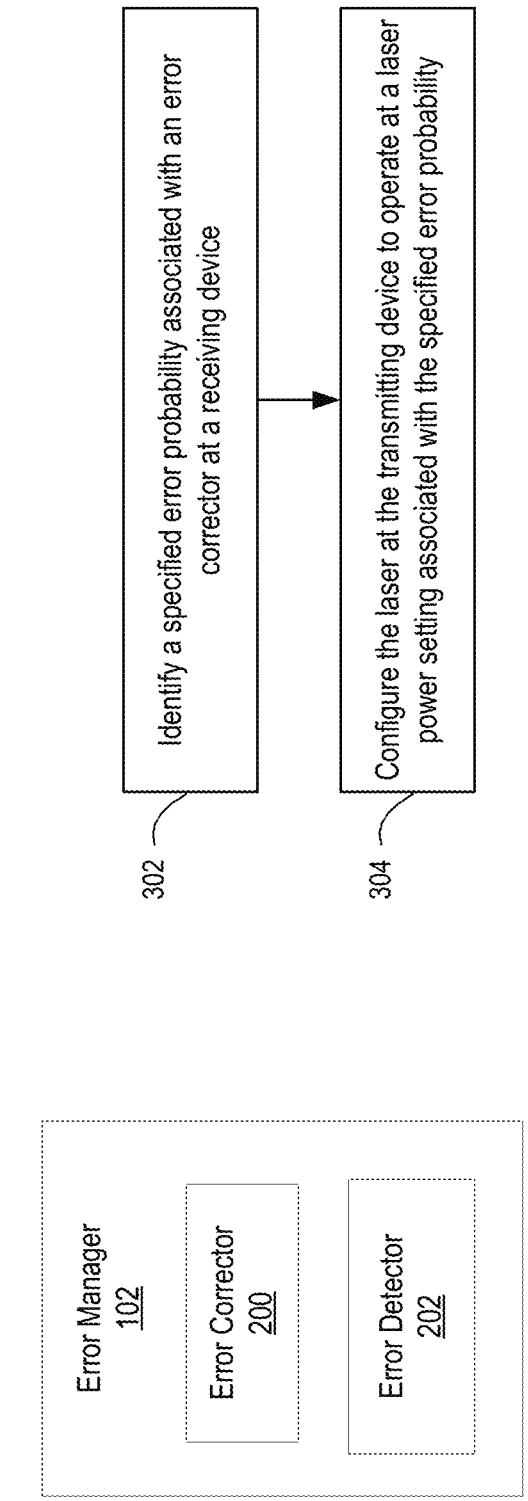

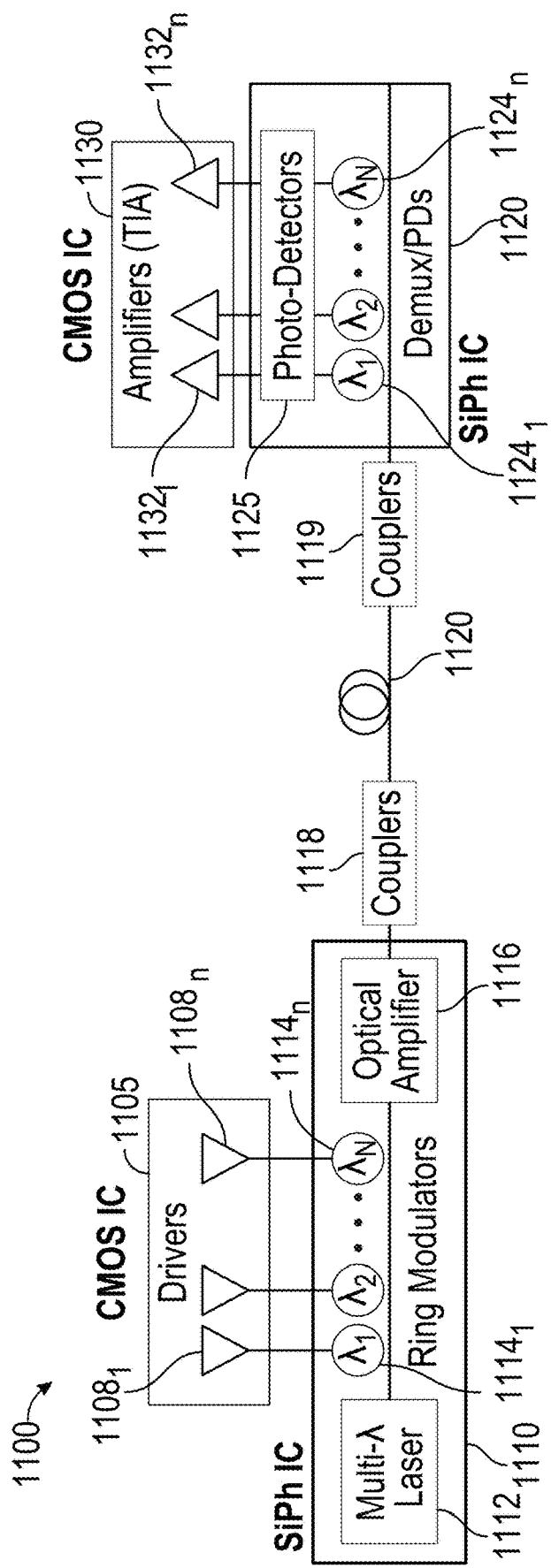
FIG. 11A
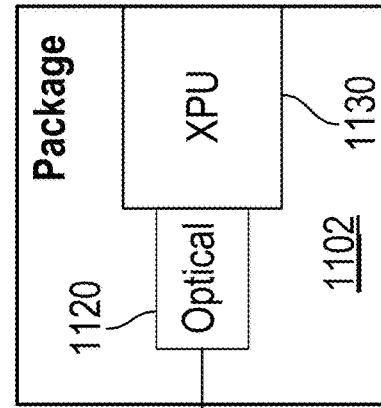
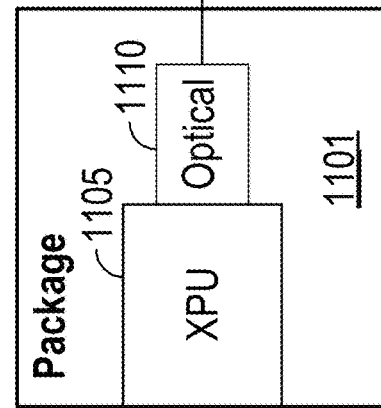
FIG. 11B

APPARATUS, METHOD, AND SYSTEM FOR PERFORMING ERROR CORRECTION BASED ON LASER POWER SETTING

TECHNICAL FIELD

Embodiments related to error correction in systems including optical communication.

BACKGROUND

In optical communications, lasers are typically an important component of optical communication links. Optical I/O systems are often configured to operate at relatively low target error probabilities, such as for example at a BER value of 1e-12, to achieve system reliability. In many cases, as the laser power setting of a laser at a transmitting device is increased, the error probability associated with the transmission of data from the transmitting device to a receiving device may decrease. Laser power is often increased to achieve low target error probabilities and may be a significant component of optical input/output power. In some instances, when the laser power setting of a laser is increased to a certain point, often referred to as a noise floor, additional increases in the laser power setting may not result in a further decrease in the error probability or may marginally improve the error probability. Some target error probabilities may be unachievable regardless of the laser power setting of the laser. Standard error correction mechanisms, such as for example standard forward error correction FEC, are often complex and may add latencies as high as 100 nanoseconds as well as consume significant computational resources.

BRIEF DESCRIPTION OF THE DRAWINGS

FIG. 2 is a block diagram representation of an embodiment of an error manager.

FIG. 3 is a flowchart representation of an example of a method of configuring a laser at a transmitting device.

FIG. 11A is a block diagram representation of a system in accordance with an embodiment.

FIG. 11B is a block diagram representation of a system in accordance with an embodiment.

DETAILED DESCRIPTION

In systems including optical communication links, wavelength division multiplexing optical input/output (I/O) is often used to transmit data between devices. There is a probability of error occurring in data during the transmission of the data from a transmitting device to a receiving device via an optical communication link. As the laser power setting of a laser at the transmitting device is increased, the probability of error occurring during transmission typically decreases. Optical communication systems are typically designed so that the probability of an error occurring during transmission of the data at the laser power setting at the transmitting device corresponds to an ability of an error correction mechanism to correct data at the receiving device in accordance with that probability of error. In other words, if the laser power setting of a laser at the transmitting device corresponds to a probability of error during data transmission having a BER value of 1e-12, an error correction mechanism having the ability to correct data such that the corrected data used by the receiving device has an error probability having a BER value of 1e-12 is used. Using an error management mechanism that relies on high latency error correction, such as for example high latency FEC, often results in relative high laser power consumption.

The use of the disclosed error management mechanism including low latency error correction, such as for example low latency FEC, to perform error correction followed by error detection and the retransmission of data with detected errors enables systems with optical communication links to achieve, for example, a target error probability of 1e-12, while a reducing laser power. For example, a laser power setting of a laser at a transmitting device that corresponds to a probability of error during data transmission having a BER value of 1e-6 can be used with an error correction mechanism having the ability to correct data such that the corrected data generated by the error correction mechanism has an error probability having a BER value of 1e-6. Using error detection to detect any error that may be present in the corrected data generated by the error correction mechanism followed by the retransmission of data with detected errors enables the system to achieve a target error probability having a BER value of 1e-12. The laser power setting corresponding to a probability of error having a BER value of 1e-6 is lower than a laser power setting that corresponds to a probability of error having a BER value of 1e-12. The use of the combination of low latency error correction, strong error detection, and retransmission results in a reduction in laser power use compared to the use of just high latency error correction. In addition, low latency error correction typically consumes less computations resources than high latency error correction.

Figure 1:
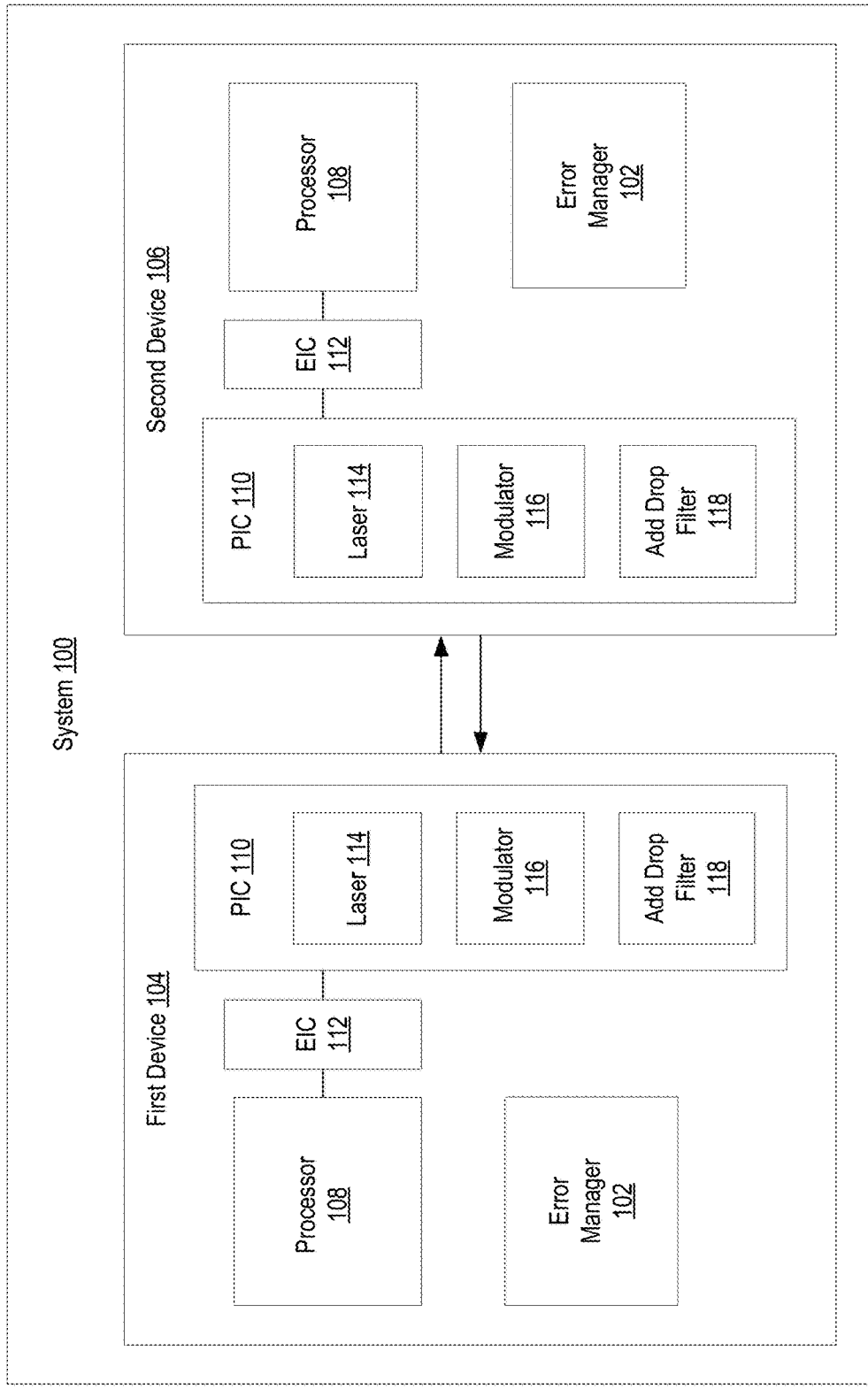
FIG. 1 is a block diagram representation of a system including an embodiment of an error manager.

Referring to FIG. 1, a block diagram representation of a system 100 including an embodiment of an error manager 102 is shown. The system 100 may be at least a portion of, for example, a data center, a server computer, a desktop computer, or a laptop computer. The system 100 includes a first device 104 and a second devices 106. The first device 104 is configured to be optically coupled to the second device 106 and the second device 106 is configured to be optically coupled to the first device 104. In an embodiment, communications between the first device 104 and the second device 106 are supported by an Intra-Die Interconnect (IDI) protocol. In an embodiment, communications between the first device 104 and the second device 106 are supported by an Intel® Ultra Path Interconnect (UPI) protocol. In an embodiment, communications between the first device 104 and the second device 106 are supported by Peripheral Component interconnect Express (PCIe) protocol. In an embodiment, communications between the first device 104 and the second device 106 are supported by Computer Express Link (CXL) protocol. In other embodiments, alternative interconnect protocols may be used.

In an embodiment, the first device 104 is a host device and the second device 106 is a remote device. In an embodiment, the first device 104 and second device 106 are similar devices. In an embodiment, the first device 104 and the second device 106 are different types of devices. While one device 106 is shown as being optically coupled to the first device 104 in FIG. 1, alternative embodiments may include additional devices 106 that are optically coupled to the first device 104.

In an embodiment, each of the first device 104 and the second device 106 includes a processor 108 configured to be communicatively coupled to a photonic integrated circuit (PIC) 110. In an embodiment, the processor 108 is configured to be communicatively coupled to the PIC 110 via an electrical interface circuit (EIC) 112. In an embodiment, the EIC 112 includes electrical components associated with facilitating optical communications and the PIC 110 includes optical components associated with facilitating optical communications.

In an embodiment, the EIC 112 a component that is external to the processor 108 and the PIC 110 and is communicatively coupled to the processor 108 and to the PIC 110. In an embodiment, the EIC 112 is a component of the processor 108. In an embodiment, the EIC 112 is a component of the PIC 110. In an embodiment, the processor 108 is communicatively coupled to the PIC 110 via an embedded multi-die interconnect bridge (EMIB) (not shown) and the EIC 112. In an embodiment, the EMIB is a passive EMIB. In alternative embodiments, the processor 108 may be communicatively coupled to the PIC 110 via alternative types of interconnects.

The processor 108 at the first device 104 is configured to generate electrical signals including data for transmission to the second device 106. The processor 108 at the second device 106 is configured to generate electrical signals including data for transmission to the first device 104. In an embodiment, each processor 108 is configured to generate two or more parallel electrical signals, where each electrical signal includes data. In an embodiment, each processor 108 is configured to generate two or more sets of parallel electrical signals, where each electrical signal includes data.

Examples of the processors 108 include, but are not limited to, a central processing unit (CPU), a graphic processing unit (GPU), a memory unit, a phase-locked loop (PLL) unit, an input/output (I/O) unit, an application specific integrated circuit (ASIC) unit, a field-programmable gate array unit, a package-embedded memory unit, a random access memory (RAM) unit, a flash memory unit, an embedded non-volatile memory unit, a graphics card, a III-V unit, an accelerator, a three-dimensional IC (3D IC), a high-bandwidth memory (HBM), and a double data rate (DDR) memory. In an embodiment, the processor 108 includes one or more compute clusters.

The first and second devices 104, 106 each include a PIC 110. The PIC 110 includes a laser 114, a modulator 116, and an add drop filter 118. The PIC 110 may including additional components that facilitate operation of the PIC 110. Each laser 114 is configured to generate a multiplexed carrier signal. The multiplexed carrier signal includes two or more or carrier signals. Each carrier signal has a different wavelength. In an embodiment, the laser 114 at the first device 104 is configured to operate at one or more selectable laser power settings. In an embodiment, the laser 114 at the second device 106 is configured to operate at one or more selectable laser power settings. In an embodiment, the laser 114 at the first device 104 is configured to operate at a specific laser power setting. In an embodiment, the laser 114 at the second device 106 is configured to operate at a specific laser power setting. In an embodiment, the laser power setting of the laser 114 at the first device 104 is different that the laser power setting of the laser 114 at the second device 106. In an embodiment, the laser power setting of the laser 114 at the first device 104 is the same as the laser power setting of the laser 114 at the second device 106.

The first and second devices 104, 106, each include an EIC 112. In an embodiment, the EIC 112 is configured to receive two or more parallel electrical signals including data from the processor 108 and transmit the two or more parallel electrical signals including the data to the PIC 110. In an embodiment, EIC 112 is configured to receive two or more sets of parallel electrical signals from the processor 108, each electrical signal including data, and generate a multiplexed electrical signal for each of the sets of parallel electrical signals for transmission to the PIC 110.

In an embodiment, the modulator 116 is configured to receive two or more parallel electrical signals from the EIC 112, receive the multiplexed carrier signal including the two or more carrier signals from the laser 114, and generate a multiplexed optical signal including two of more optical signals. Each optical signal in the multiplexed optical signal is an optical representation of an associated electrical signal. The multiplexed optical signal is transmitted from the transmitting device 104, 106 to the receiving device 104, 106, where the transmitting device 104, 106 is one of the first and second devices 104, 106 and the receiving device 104, 106 is the other one of the first and second devices 104, 106.

In an embodiment, the modulator 116 is configured to receive two or more multiplexed electrical signals from the EIC 112, receive the multiplexed carrier signal including the two or more carrier signals from the laser 114, and generate a multiplexed optical signal including two of more optical signals. Each optical signal in the multiplexed optical signal is an optical representation of an associated multiplexed electrical signal. The multiplexed optical signal is transmitted from the transmitting device 104, 106 to the receiving device 104, 106, where the transmitting device 104, 106 is one of the first and second devices 104, 106 and the receiving device 104, 106 is the other one of the first and second devices 104, 106.

In an embodiment, the add drop filter 118 at a receiving device 104, 106 is configured to receive the multiplexed optical signal from a transmitting device 104, 106, where the transmitting device 104, 106 is one of the first and second devices 104, 106 and the receiving device 104, 106 is the other one of the first and second devices 104, 106. The multiplexed optical signal includes the two or more optical signals. In an embodiment, the add drop filter 118 is configured to generate two or more electrical signals based on the two or more optical signals in the received multiplexed optical signal. Each generated electrical signal is representative of the associated optical signal in the received multiplexed optical signal. Each of the generated electrical signals includes a received version of the data transmitted from the transmitting device 104, 106. Each generated electrical signal may be referred to a received version of the electrical signal. In an embodiment, the EIC 112 is configured to receive the generated electrical signals including the data for transmission to the processor 108 of the receiving device 104, 106. In an embodiment, the EIC 112 is configured to receive the generated electrical signals including the data for transmission to the error manager 102 of the receiving device 104, 106.

In an embodiment, the add drop filter 118 is configured to generate two or more multiplexed electrical signals based on the two or more optical signals in the received multiplexed optical signal. Each generated multiplexed electrical signal is representative of the associated optical signal in the received multiplexed optical signal. The multiplexed electrical signal is transmitted to the EIC 112. The EIC 112 is configured to receive the multiplexed electrical signal and generate two or more sets of parallel electrical signals, where each electrical signal includes a received version of the data transmitted from the transmitting device 104, 106. Each generated electrical signal may be referred to a received version of the electrical signal. In an embodiment, the EIC 112 is configured to transmit the generated two or more sets of parallel electrical signals to the processor 108 of the receiving device 104, 106. In an embodiment, the EIC 112 is configured to transmit the generated two or more sets of parallel electrical signals to the error manager 102 of the receiving device 104, 106.

Each of the first and second devices 104, 106 includes an embodiment of the error manager 102. In an embodiment, the error manager 102 is external to the processor 108 and communicatively coupled to the processor 108. In an embodiment, the error manager 102 is a component of the processor 108. In an embodiment, the error manager 102 is a component of a I/O hub of the processor 108. In an embodiment, the error manager 102 is a component of the EIC 112. The operation of different embodiments of the error manager 102 will be described below. While the first and second devices 104, 106 have been described as including the components shown in FIG. 1 the first device 104 and the second device 106 may include additional components that facilitate operation of the first and second devices 104, 106.

While embodiments that apply to a multiplexed multiwavelength or multi-carrier system have been described, alternative embodiments may include optical links that include one or more carriers.

Referring to FIG. 2, an embodiment of an error manager 102 is shown. In an embodiment, the error manager 102 includes an error corrector 200 and an error detector 202. The error corrector 200 is configured to perform error correction on the received versions of the electrical signals received at the receiving device 104, 106 and generate corrected versions of the electrical signals. The received versions of the electrical signals include the data generated by the processor 108 of the transmitting device 104, 106. The receiving device 104, 106 is one of the first and second devices 104, 106 and the transmitting device 104, 106 is the other one of the first and second devices 104, 106. In an embodiment, the error corrector 200 is configured to perform low latency forward error correction (FEC) on the received versions of the electrical signals. In an embodiment, the error corrector 200 is configured to perform error correction in accordance with a specified error probability associated with the error corrector 200. The specified error probability is the probability of an uncorrected error being present in a corrected version of the electrical signal generated by the error corrector 200. In an embodiment, the specified error probability is greater than a target error probability associated with the transmission of data from the transmitting device 104, 106 to the receiving device 104, 106. In an embodiment, the specified error probability is defined as a bit error rate (BER). The specified error probability may also be referred to as the raw error probability. In an embodiment, the raw probability is defined as a raw BER value.

The error detector 202 is configured to detect whether any uncorrected errors are present in the corrected versions of the electrical signals generated by the error corrector 200. If the error detector 202 detects an error in a corrected version of an electrical signal, the error detector 202 is configured to inform the processor 108 at the receiving device 104, 106. The processor 108 at the receiving device 104, 106 issues a retransmission request for the data in the corrected version of the electrical signal including the uncorrected error from the transmitting device 104, 106. The processor 108 at the transmitting device 104, 106 receives the retransmission request and generates an electrical signal including the requested data for transmission to the device 104, 106. If the error detector 202 does not detect any uncorrected error in the corrected version of the electrical signal, the data in the corrected electrical signal is used by the receiving device 104, 106. In an embodiment, if the error detector 202 does not detect any uncorrected error in the corrected version of the electrical signal, the receiving device 104, 106 transmits an acknowledgement to the transmitting device 104, 106 indicating that there was no error was detected in the received version of the data. In an embodiment, the error corrector 200 is configured to perform error correction in accordance with a specified error probability or the raw BER value of 1e-6. The BER value of the actual error probability achieved with the use of such an error corrector 200 may be as low as 4e-24.

Referring to FIG. 3, an example of a method 300 of configuring a laser 114 at a transmitting device 104, 106 is shown. At 302, a specified error probability associated with an error corrector 200 at a receiving device 104, 106 is identified. The specified error probability is the probability of an uncorrected error being present in a corrected version of an electrical signal generated by the error corrector 200. In an embodiment, the error corrector 200 is configured to operate at the specified error probability. In an embodiment, the error corrector 200 is configured to operate at a selectable error probability, where one of the selectable error probabilities is the specified error probability. In an embodiment, the specified error probability is defined as a bit error rate (BER) value. In an embodiment, the specified error probability has a BER value of 1e-5. In an embodiment, the specified error probability has a BER value of 1e-6. In an embodiment, the specified error probability is greater than a target error probability. The use of the error detector 202 to perform error detection in a corrected version of an electrical signal followed by retransmission of the data associated with corrected versions of electrical signals containing uncorrected errors typically meets or exceeds the target error probability. In an embodiment, the target error probability has a BER value of 1e-12.

At 304, the laser 114 at the transmitting device 104, 106 is configured to operate at a laser power setting associated with the specified error probability. The laser power setting of the laser 114 at the transmitting device 104, 106 is associated with an error probability associated with the transmission of data from the transmitting device 104, 106 to the receiving device 104, 106. When the laser 114 is configured to operate at the laser power setting associated with the specified error probability the error probability associated with the transmission of data from the transmitting device 104, 106 to the receiving device 104, 106 is the specified error probability. In an embodiment, the error probability is defined as a bit error rate (BER).

In many cases, as the laser power setting of the laser 114 at the transmitting device 104, 106 is increased, the error probability associated with the transmission of data from the transmitting device 104, 106 to the receiving device 104, 106 may decrease. In many instances, when the laser power setting of the laser 114 is increased to a certain point, often referred to as a noise floor, additional increases in the laser power setting may not result in a further decrease in the error probability associated with the transmission of data from the transmitting device 104, 106 to the receiving device 104, 106. In such cases, the use of the error manager 200 may overcome limitations associated with the noise floor and enable the system 100 to meet target error probabilities that exceed the error probability values associated with the noise floor.

In some instances, regardless of how much the laser power setting of the laser 114 at the transmitting device 104, 106 is increased, a target error probability may not be achievable. This may occur in cases where even at a maximum laser power setting of the laser 114 at the transmitting device 104, 106, the error probability associated with the value of the maximum power setting is less than the target error probability. The use of the error manager 200 may overcome such limitations and enable the system to meet target error probabilities that exceed a maximum achievable error probability associated with just the laser power settings of the laser 114.

Figure 4:
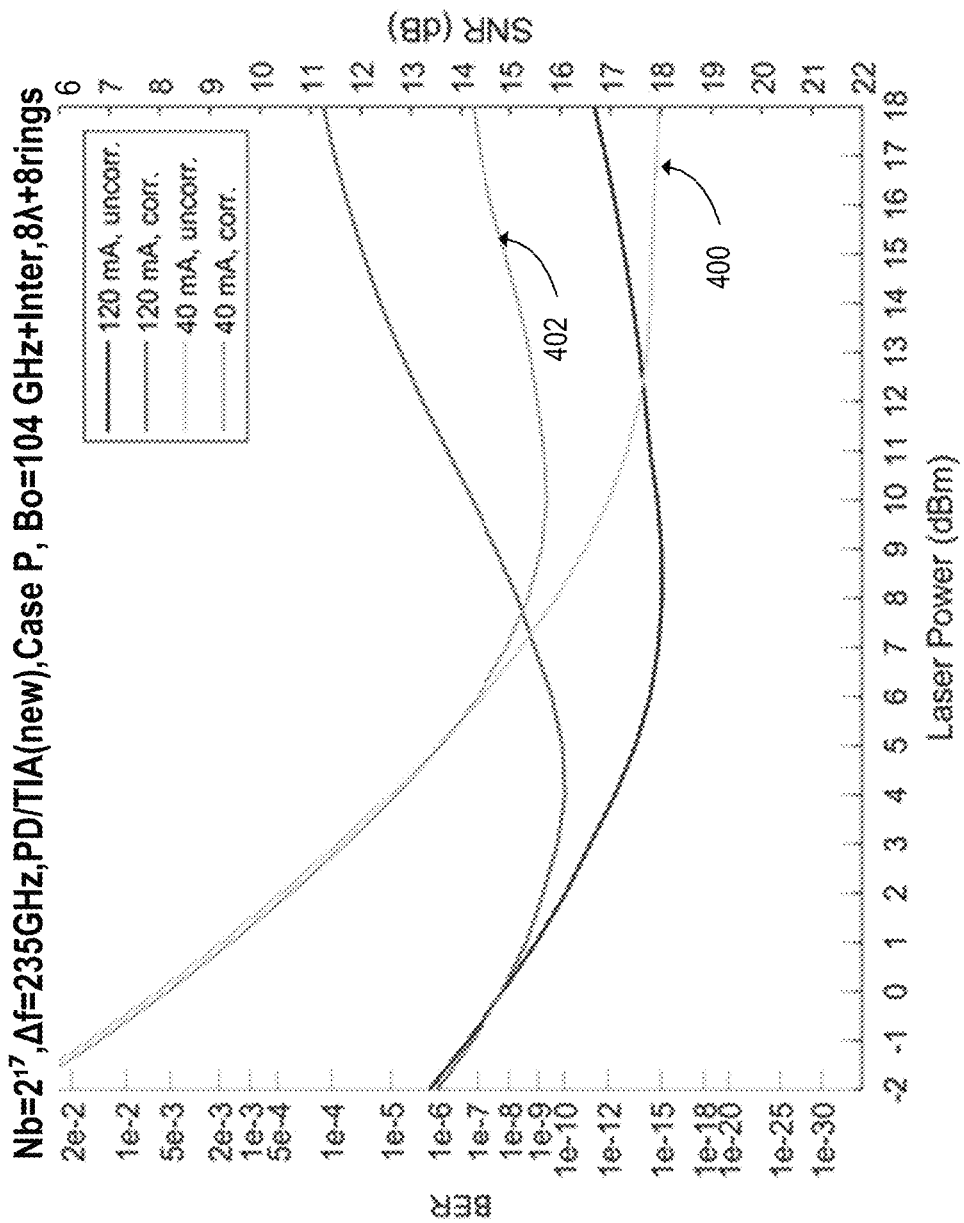
FIG. 4 is a graphical representation of examples of relationships between probabilities of error occurring during transmission of data from a transmitting device to a receiving device as a function of different laser power settings of a laser at a transmitting device.

Referring to FIG. 4 a graphical representation of four examples of relationships between the probabilities of error occurring during the transmission of data from a transmitting device 104, 106 to a receiving device 104, 106 as a function of different laser power settings of the laser 114 at the transmitting device 104, 106 is shown. Each of the four examples is associated with different operating conditions of an example system 100. The error probabilities are specified as a BER value.

The use of an error manager 102 may enable a system 100 to overcome limitations associated with a noise floor. For example, referring to data line 400, the BER value associated with the transmission of data from an example transmitting device 104, 106 to an example receiving device 104, 106 decreases as the laser power setting of the laser 114 at the example receiving device 104, 106 is increased until the laser power setting is increased to approximately 13 dBm. Once the laser power setting is increased to 13 dBm, additional increases in the laser power setting do not result in significant decreases in the associated BER value. The laser 114 of the example transmitting device 104, 106 has reached a noise floor at 13 dBm, where additional increases in the laser power setting of the laser 114 do not result a further decrease of significance in the error probability associated with the transmission of data from the example transmitting device 104, 106 to the example receiving device 104, 106. The use of the error manager 200 enables the example system 100 to overcome limitations associated the noise floor to meet target error probabilities.

The use of the error manager 102 may result in power savings. In the example associated with data line 400, a target BER value of 1e-15 may be selected and an error corrector 200 may be configured to handle a specified error probability of a BER value of 1e-6. If for example, the error manager 102 is not available for use at the example receiving device 104, 106, the laser power setting of the laser 114 at the example transmitting device 104, 106 would be set at approximately 13 dBm to meet the target BER value of 1e-15. When the error manager 200 is available for use at the example receiving device 104, 106, the error corrector 202 performs error correction on the received versions of the electrical signals including data in accordance with a specified BER value of 1e-6. The laser power setting of the laser 114 at the transmitting device 104, 106 would be set at the laser power setting of approximately 5 dBm. The laser power setting of the laser 114 at 5 dBm is associated with the BER value of 1e-6. The error probability associated with the transmission of data from the example transmitting device 104, 106 to the example receiving device 104, 106 with the laser setting at the transmitting device 104, 106 at 5 dBm would have a BER value of 1e-6. The probability of an error occurring in a corrected version of a received electrical signal including data generated by the error corrector 200 would be in accordance with a BER value of 1e-6. The use of the error detector 202 to detected uncorrected errors in the corrected signals generated by the error corrector 200 and retransmission of data in corrected electrical signals with detected uncorrected errors from the transmitting device 104, 106 to the receiving device 104, 106 would enable the system to meet or exceed the target BER value of 1e-15. The use of the error manager 102 in the example system would result in a laser power saving of approximately 9 dBm.

As shown above, the laser power setting of the laser 114 at a transmitting device 104, 106 associated with the specified error probability may be lower than the laser power setting of the laser 114 associated with the target error probability. As a result, there may be power savings associated with operation of the laser 114 at the transmitting device 104,106.

In addition, the performance of error correction in accordance with the specified error probability as opposed to in accordance with the target error probability may result in computational resource savings, reduction in latencies associated with error correction and/or power savings associated with the performance of the error corrector 200. For example, using an error corrector 202 to perform of error correction on a received electrical signal in accordance with a specified error probability having a BER value of 1e-6 may take approximately 2 nanoseconds, while using an error corrector 202 to perform of error correction on a received electrical signal in accordance with a higher target error probability, such as for example having a BER value of 1e-12 may take over 100 nanoseconds. In some embodiments, the target error probability may have a BER value of 1e-12. In some cases, an error corrector 202 configured to perform error correction in accordance with a specified error probability having a BER value of 1e-6 may use less than 0.5 picojoules per bit while an error corrector 202 configured to perform error correction in accordance with a specified error probability having a BER value of 1e-16 or better may use as much as 10 picojoules per bit.

In some cases, regardless of how much the laser power setting of a laser 114 at a transmitting device 104, 106 is increased, a target error probability may not be achievable. Referring to data line 402, the BER values associated with the transmission of data from an example transmitting device 104, 106 to an example receiving device 104, 106 decreases as the laser power setting of the laser 114 at the example receiving device 104, 106 is increased until the laser power setting is increased to approximately 10 dBm. The BER value associated with the laser power setting of 10 dBm is approximately 1e-9. Once the laser power setting is increased to 10 dBm, additional increases in the laser power setting do not result in a decrease in the associated BER value. The example system operation defined by data line 402 is unable to achieve a BER value of greater than 1e-9 regardless of the laser power setting of the laser 114 at the example transmitting device 104, 106.

The use of the error manager 200 enables the example system 100 to overcome such limitations and enables the example system 100 to meet error probabilities that exceed a maximum achievable error probability associated solely with the laser power setting of the laser 114 at the example transmitting device 104. 106. For example, referring to data line 402, if a target error probability having a BER value of 1e-15 is selected, regardless of how much the laser power is increased, the target error probability having a BER value of 1e-15 is not achievable. In this example, the performance of error correction by the error corrector 200, error detection by the error detector 202, and the retransmission of data in the corrected electrical signals including detected error results in meeting at least a target BER of 1e-15 associated with the transmission of data from the example transmitting device 104, 106 to the example receiving device 104, 106. In other words, target error probabilities that may not be achievable by increasing the laser power setting of the laser 114 at the transmitting device 104, 106 may be achievable with the use of the error manager 102.

Figure 5:
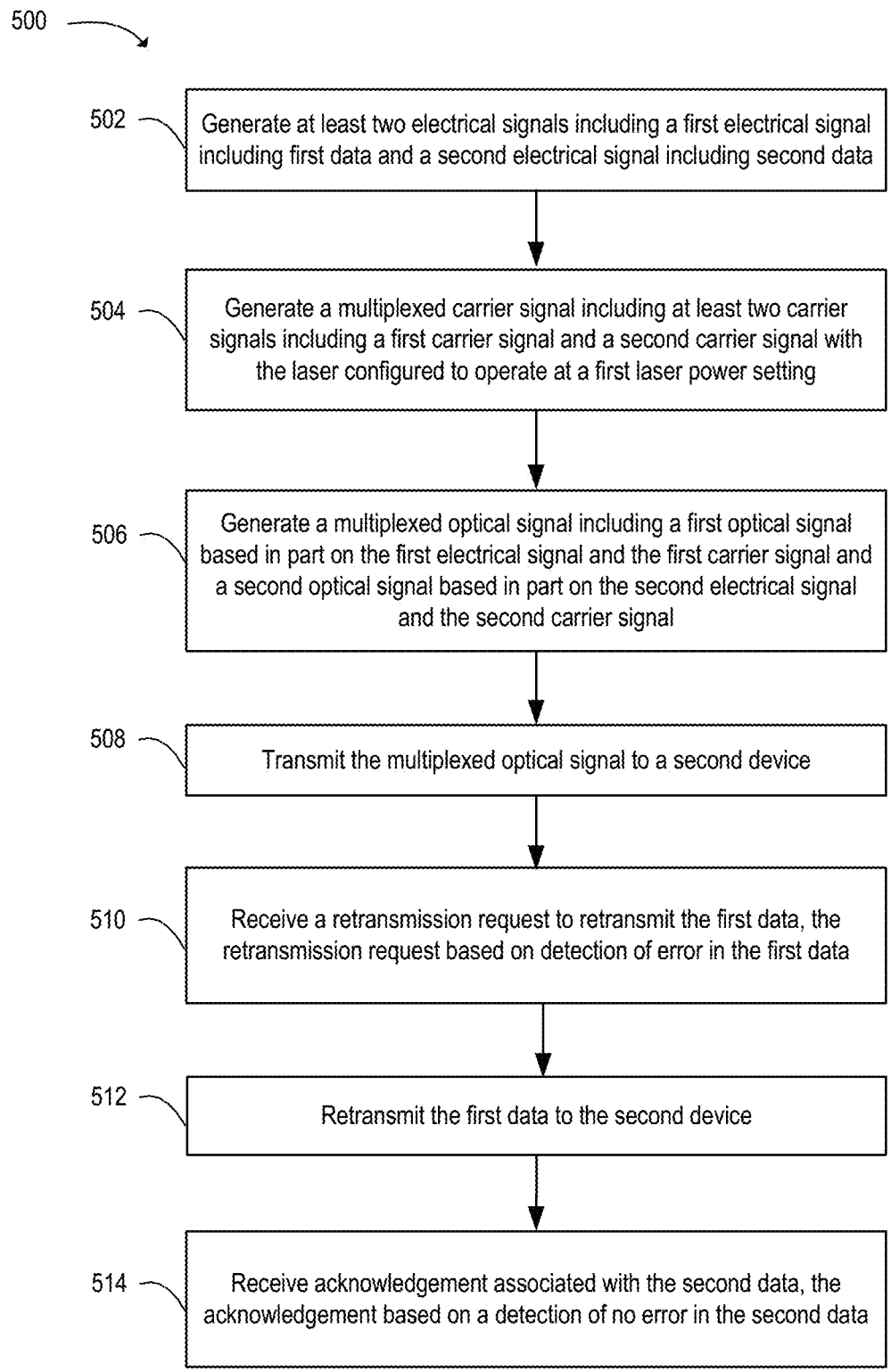
FIG. 5 is a flow chart representation of a method of implementing an embodiment of error correction.

Referring to FIG. 5, a flow chart representation of a method 500 of implementing an embodiment of error correction is shown. The method 500 is performed by the transmitting device 104, 106. The transmitting device 104, 106 is one of the first device 104 and the second device 106 and the receiving device 104, 106 is the other one of the first device 104 and the second device 106. The method 500 may be performed by the processor 108, the PIC 110 and the error manager 102 at the transmitting device 104, 106 in combination with additional components of the system 100. The method 500 may be performed by hardware circuitry, firmware, software, and/or combinations thereof.

At 502, the processor 108 at the transmitting device 104, 106 generates at least two electrical signals including data. The at least two electrical signals include a first electrical signal including first data and a second electrical signal including second data. At 504, the laser 114 at the PIC 110 at the transmitting device 104, 106 generates a multiplexed carrier signal including at least two carrier signals including a first carrier signal and a second carrier signal. The laser 114 is configured to operate at a first laser power setting. At 506, the modulator 116 at the PIC 110 at the transmitting device 104, 106 generates a multiplexed optical signal including a first optical signal based in part on the first electrical signal and the first carrier signal and a second optical signal based in part on the second electrical signal and the second carrier signal. The multiplexed optical signal may include more that two optical signals where each optical signal is based on an associated electrical signal and an associated carrier signal. At 508, the PIC 110 at the transmitting device 104, 106 transmits the multiplexed optical signal to the receiving device 104, 106. In an embodiment, the multiplexed optical signal is transmitted to a semiconductor optical amplifier (SOA) prior to transmission to the receiving device 104, 106.

At 510, the processor 108 at the transmitting device 104, 106 receives a retransmission request to retransmit the first data to the receiving device 104, 106. The retransmission request is based on detection of error in the first data by the error manager 102 at receiving device 104, 106. At 512, the transmitting device 104, 106 retransmits the first data to the receiving device 104, 106. At 514, the processor 108 at the transmitting device 104, 106 receives an acknowledgement associated with the second data. The acknowledgement is based on a detection of no error in the second data.

Figure 6:
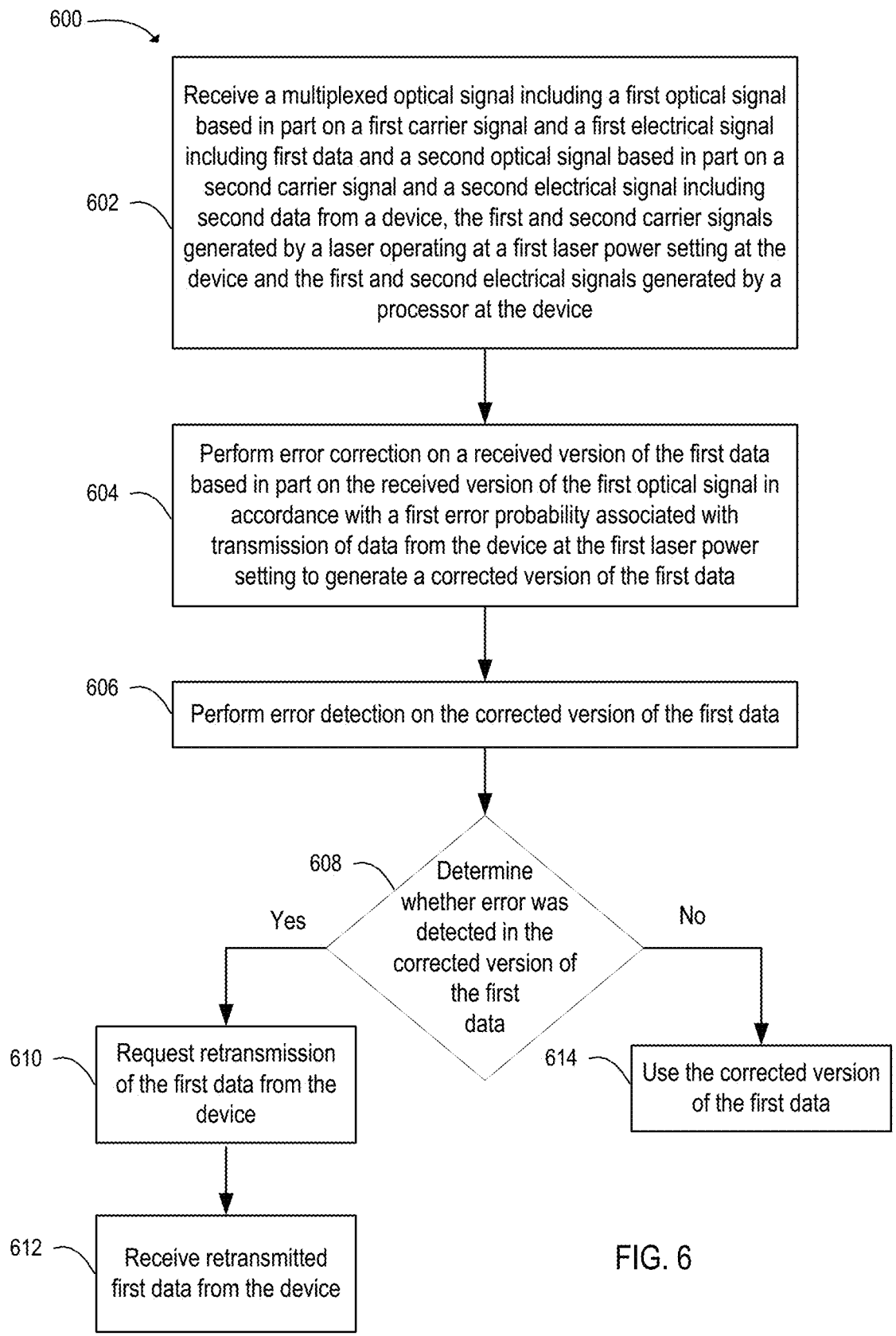
FIG. 6 is a flow chart representation of a method of implementing an embodiment of error correction.

Referring to FIG. 6, a flow chart representation of a method 600 of implementing an embodiment of error correction is shown. The method 600 is performed by the receiving device 104, 106. The receiving device 104, 106 is one of the first device 104 and the second device 106 and the transmitting device 104, 106 is the other one of the first device 104 and the second device 106. The method 600 may be performed by the processor 108, the PIC 110 and the error manager 102 at the receiving device 104, 106 in combination with additional components of the system 100. The method 600 may be performed by hardware circuitry, firmware, software, and/or combinations thereof.

At 602, the add drop filter 118 at the PIC 110 at the receiving device 104, 106 receives a multiplexed optical signal including a first optical signal based in part on a first carrier signal and a first electrical signal including first data and a second optical signal based in part on a second carrier signal and a second electrical signal including second data from a transmitting device 104, 106. The first and second carrier signals were generated by a laser 114 operating at a first laser power setting at the transmitting device 104, 106 and the first and second electrical signals were generated by a processor 108 at the transmitting device 104, 106. The multiplexed optical signal may include a plurality of optical signals including the first and second optical signals. In an embodiment, the multiplexed optical signal is received at the add drop filter 118 via a polarization splitter rotator (PSR).

At 604, the error corrector 200 at the error manager 102 of the receiving device 104, 106 performs error correction on a received version of the first data based in part on the received version of the first optical signal in accordance with a first error probability associated with transmission of data from the transmitting device 104, 106 at the first laser power setting to generate a corrected version of the first data. At 606, the error detector 202 at the error manager 102 of the receiving device 104, 106 performs error detection on the corrected version of the first data. The results of the error detection are transmitted to the processor 108 of the receiving device 104, 106. The processor 108 at the receiving device 104, 106 determines whether error was detected in the corrected version of the first data based on the results of the error detection provided by the error detector 202. If the processor at the receiving device 104, 106 determines that error was detected in the corrected version of the first data, at 610, the processor 108 at the receiving device 104, 106 requests retransmission of the first data from the transmitting device 104, 106. At 612, the PIC 110 of the receiving device 104, 106 receives the retransmitted first data from the transmitting device 104, 106 via the optical communication link. If the processor at the receiving device 104, 106 determines that error was not detected in the corrected version of the first data, at 614, the processor 108 at the receiving device 104, 106 uses the corrected version of the first data generated by the error corrector 200 of the error manager 102 at the receiving device 104, 106.

Figure 7:
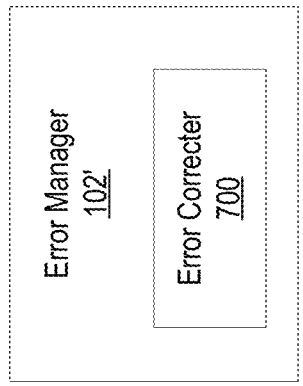
FIG. 7 is a block diagram representation of an embodiment of an error manager.

Referring to FIG. 7, a block diagram representation of an embodiment of an error manager 102' is shown. The error manager 102' includes an error corrector 700. The error manager 102' may be used when the retransmission of data based on a detection of error in the corrected version of the data is not available.

The error corrector 700 is configured to perform error correction on the received versions of the electrical signals received at the receiving device 104, 106 and generate corrected versions of the electrical signals. The received versions of the electrical signals include the data generated by the processor 108 of the transmitting device 104, 106. The receiving device 104, 106 is one of the first and second devices 104, 106 and the transmitting device 104, 106 is the other one of the first and second devices 104, 106. In an embodiment, the error corrector 700 is configured to perform low latency forward error correction (FEC) on the received versions of the electrical signals. In an embodiment, the error corrector 700 is configured to perform error correction in accordance with a specified error probability associated with the error corrector 700. The specified error probability is the probability of an uncorrected error being present in a corrected version of the electrical signal generated by the error corrector 700. In an embodiment, the specified error probability is defined as a bit error rate (BER).

The specified error probability is greater than a target error probability associated with the transmission of data from the transmitting device 104, 106 to the receiving device 104, 106. While the probability of an error being presented in a corrected version of the electrical signals is higher than the target probability, the use of an error corrector 700 with a lower specified error probability may result in computational resource savings, reduction in latencies associated with error correction and/or power savings associated with the performance of the error corrector 700. In additional the laser 114 at the transmitting device 104, 106 will be configured to operated at a laser power setting corresponding to the specified error probability associated with the error corrector 700. This may result in additional power savings associated with the use of the laser 114 at a lower laser power setting.

Figure 8:
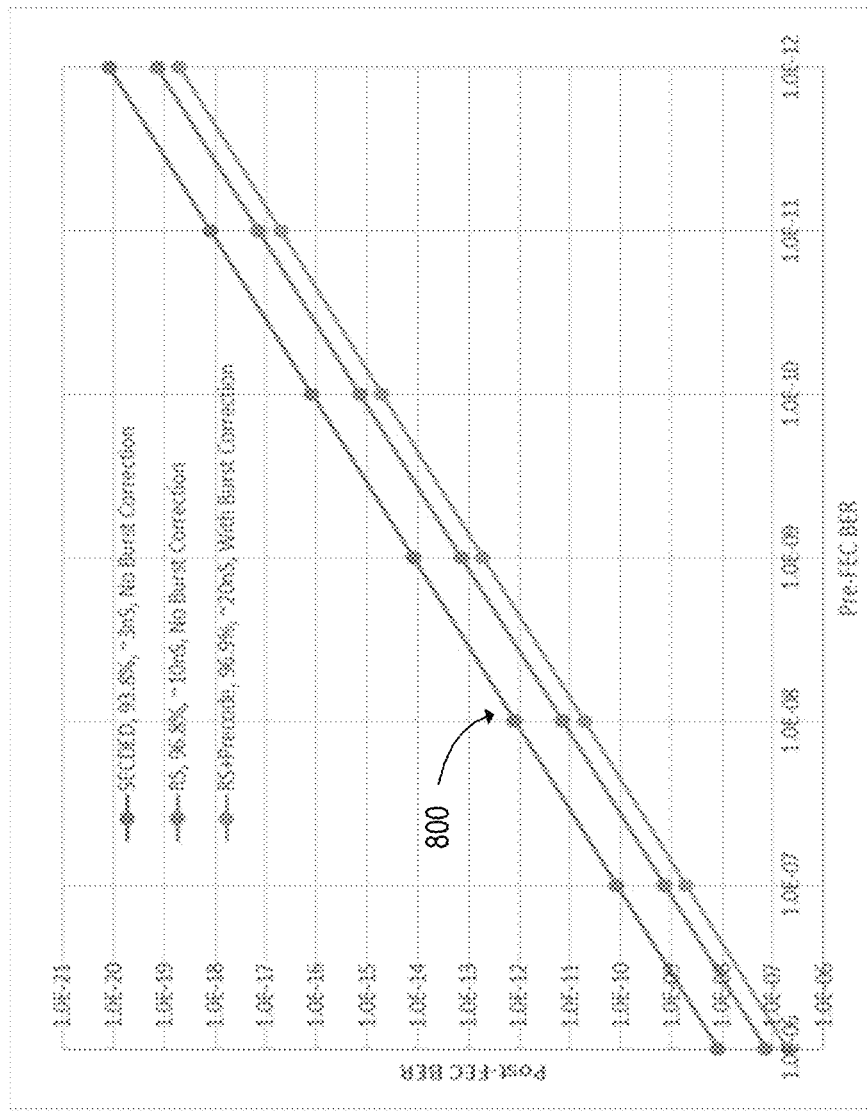
FIG. 8 is a graphical representation of a comparison between examples of probabilities of error occurring during transmission of data from a transmitting device to a receiving device with and without application of an embodiment of error correction.

Referring to FIG. 8, a graphical representation of a comparison between examples of probabilities of error occurring during transmission of data from an example transmitting device 104, 106 to an example receiving device 104, 106 with and without application of an embodiment of error correction is shown. For example, referring to the point 800, the error probability associated with the transmission of data from an example transmitting device 104, 106 to an example receiving device 104, 106 has a BER value of 1e-8 without the performance of error correction. The error probability associated with the transmission of data from a transmitting device 104, 106 to a receiving device 104, 106 has lower a BER value of 1e-12 with the performance of error correction. The laser power setting of the laser 114 at the example transmitting device 104, 106 can be placed at a lower laser power setting with the performance of error correction compared to the laser power setting of the laser 114 without the performance of error correction.

Figure 9:
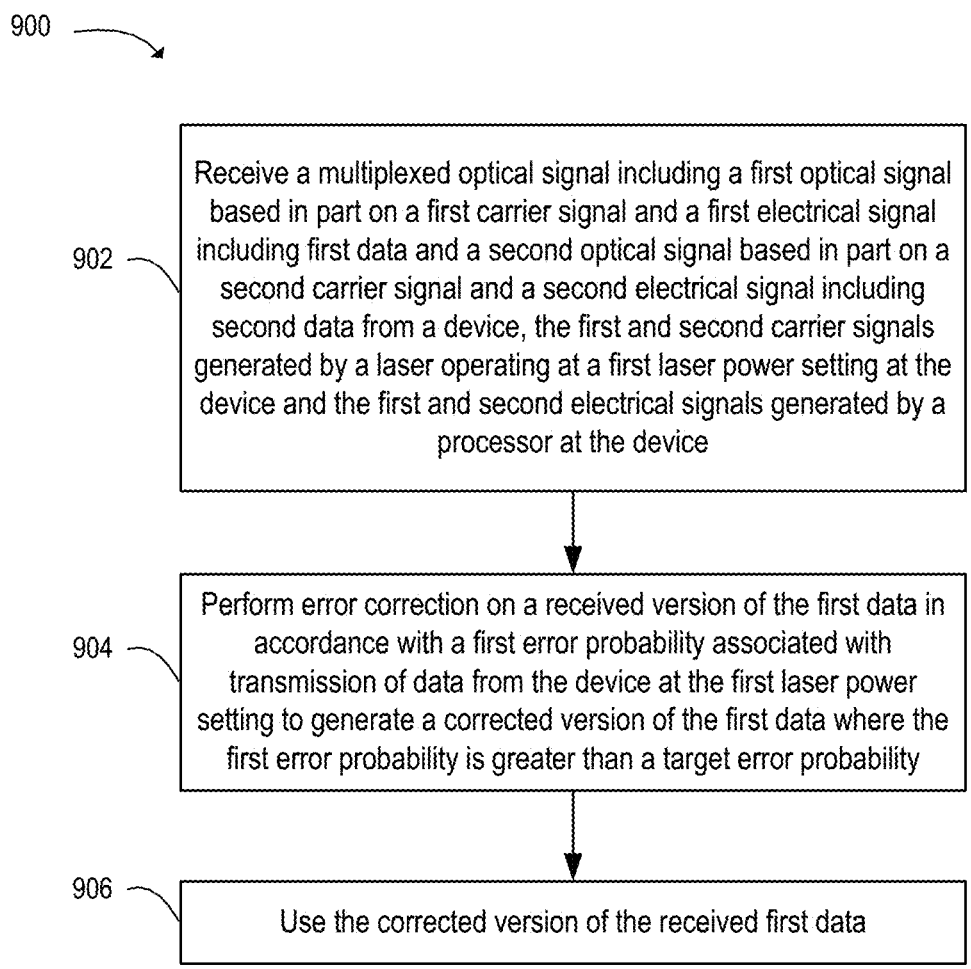
FIG. 9 is a flow chart representation of a method of implementing an embodiment of error correction.

FIG. 9 is a flow chart representation of a method 900 of implementing an embodiment of error correction using an embodiment of the error manager 102'. The method 600 is performed by the receiving device 104, 106. The receiving device 104, 106 is one of the first device 104 and the second device 106 and the transmitting device 104, 106 is the other one of the first device 104 and the second device 106. The method 900 may be performed by the processor 108, the PIC 110 and the error manager 102 at the receiving device 104, 106 in combination with additional components of the system 100. The method 900 may be performed by hardware circuitry, firmware, software, and/or combinations thereof.

At 902, the add drop filter 118 at the PIC 110 at the receiving device 104, 106 receives a multiplexed optical signal including a first optical signal based in part on a first carrier signal and a first electrical signal including first data and a second optical signal based in part on a second carrier signal and a second electrical signal including second data from a transmitting device 104,106. The first and second carrier signals were generated by a laser 114 operating at a first laser power setting at the transmitting device 104, 106 and the first and second electrical signals were generated by a processor 108 at the transmitting device 104, 106. The multiplexed optical signal may include a plurality of optical signals including the first and second optical signals.

At 904, the error corrector 700 at the error manager 102' of the receiving device 104, 106 performs error correction on a received version of the first data based in part on the received version of the first optical signal in accordance with a first error probability associated with transmission of data from the transmitting device 104, 106 at the first laser power setting to generate a corrected version of the first data. The first error probability is greater than a target error probability. At 906, the processor 108 at the receiving device uses the corrected version of the first data.

The use of low latency FEC in combination with retransmission of data with detected error may reduce power consumption by lasers in optical communication links. Since laser power may be a significant component of optical I/O, overall optical link power may be optimized. In addition, the use of low latency FEC in combination with retransmission of data with detected error may overcome laser power BER floor issues, increase system reliability at relatively low latencies. Standard FEC, such as KP and KR FEC in IEEE Ethernet 802.3 may add latencies of over 100 nanoseconds.

I/O disaggregation trends in microprocessor architecture may lead to increased growth in I/O bandwidth and an increased percentage of CPU socket power may be allocated to I/O. The use of wavelength-division multiplexing optical I/O may provide higher density in terms of bandwidth per mm die edge or square mm die area. Reducing the error probability associated with the transmission of data from the transmitting device to the receiving device in combination with the use of low latency error correction, such as for example low latency FEC, and retransmission of data with detected error may generate power savings and achieve better failure in time (FIT) than the use of just a standard FEC.

Figure 10:
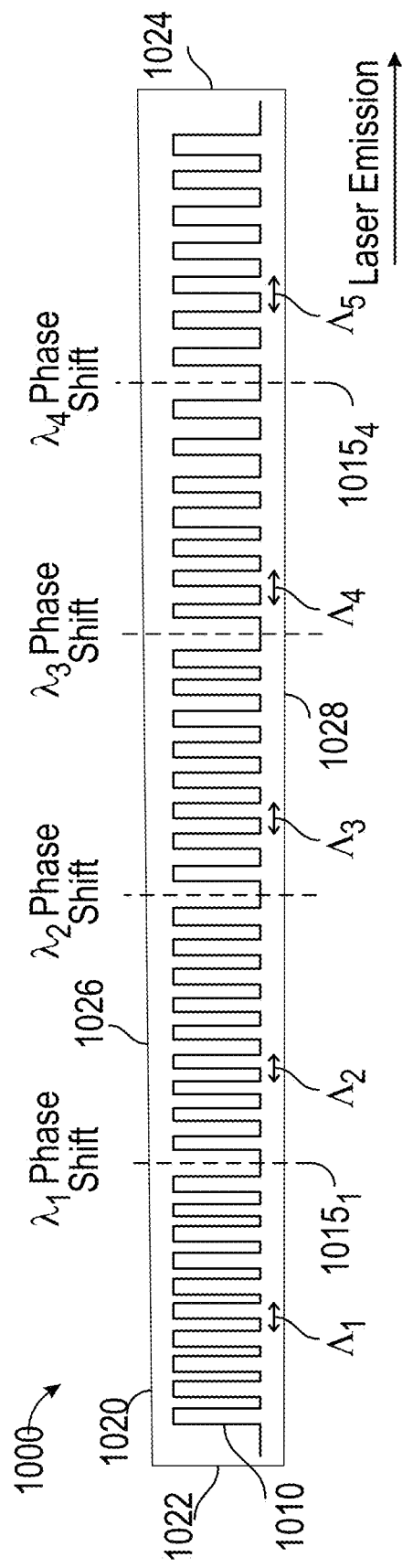
FIG. 10 is an illustration of a multi-wavelength laser in accordance with an embodiment.

Referring to FIG. 10, an illustration of a multi-wavelength laser 1000 in accordance with an embodiment is shown. In an embodiment, a laser can implement gratings having different pitches, while keeping waveguide width constant. In the embodiment of FIG. 10, laser 1000 is a four-wavelength laser; understand of course that more or fewer wavelengths can be implemented in a laser of an embodiment. As illustrated, laser 1000 is formed of a waveguide 1020 having a grating 1010 that extends from a first end 1022 of waveguide 1020 to a second end 1024 of waveguide 1020. As further shown, waveguide 1020 is further defined by a first side 1026 and a second side 1028.

The grating 1010 has a variable grating pitch across a length of waveguide 1020. In an embodiment, different grating pitches $\Lambda_{1-5}$ are present to effect multiple lasing wavelengths. Thus, there are a plurality of phase shift locations $1015_{1-4}$ corresponding to four lasing wavelengths $\lambda_1$-$\lambda_4$ realized by these different grating pitches. Understand while in the embodiment of FIG. 10, four such phase shift locations are illustrated for the representative four-wavelength laser, more or fewer such phase shift locations may be present.

Referring to FIG. 11A, a block diagram representation of a system 1100 in accordance with an embodiment is shown. The system 1100 may be any type of computing system, ranging from a small portable device to larger devices such as desktop computers, server computers or so forth. The system 1100 includes various electrical ICs and multiple photonic ICs. Specifically, as shown, a first electrical IC 1105, which may be implemented as a CMOS IC, includes a plurality of drivers $1108_{1-n}$. Although embodiments are not limited in this regard, assume that IC 1100 is a SoC or other processor. Drivers 1108 may be implemented to receive incoming data or other information from a source circuit within IC 1105, such as a processing core or other source circuit. In turn, drivers 1108 communicate information electrically to a plurality of ring modulators $1114_{1-n}$, which are adapted on a first silicon photonic (SiPh) IC 1110. Photonic IC 1110 includes transmitter circuitry including a multi-wavelength DFB laser 1112 in accordance with an embodiment, to efficiently generate optical energy of multiple wavelengths.

Ring modulators 1114 each may be configured to modulate incoming information onto a carrier optical signal of a given wavelength. In turn, the modulated optical signals are amplified in an optical amplifier 1116, which may be implemented as a semiconductor optical amplifier (SOA).

The information communicated from IC 1110 may be coupled via one or more couplers 1118 to an optical interconnect 1120, shown as one or more optical fibers. In turn, optical interconnect 1120 couples, via another one or more couplers 1119, to another SiPh IC 1120, which in this illustration includes receiver circuitry. As shown, a plurality of demultiplexers 11241-n are provided to receive the modulated optical information of a given wavelength, which may then be converted in photodetectors 1125 to electrical information that in turn is provided to another electrical IC 1130. In an embodiment, second electrical IC 1130, which may be implemented as a CMOS IC, includes a plurality of transimpedance amplifiers 11321-n. Although embodiments are not limited in this regard, IC 1130 may be another SoC, a memory for IC 1110 or another such electrical circuit. Understand while shown at this high level in the embodiment of FIG. 11, many variations and alternatives are possible. Of course this control circuitry instead may be present in an electrical IC (such as CMOS IC 1105).

Referring to FIG. 11B, a block diagram representation of a system 1100' in accordance with an embodiment is shown. The system 1100' may generally be configured the same as system 1100 of FIG. 11A, and thus same numbering applies. In this implementation however, electrical and optical ICs are implemented in corresponding packages 1101, 1102 that are coupled via optical interconnect 1120. Note that in various implementations, different manners of packaging CMOS and SiPh ICs may be realized, including commonly packaging multiple die of these ICs into a common package, such that a single package includes one or more CMOS die and one or more SiPh die.

Figure 12:
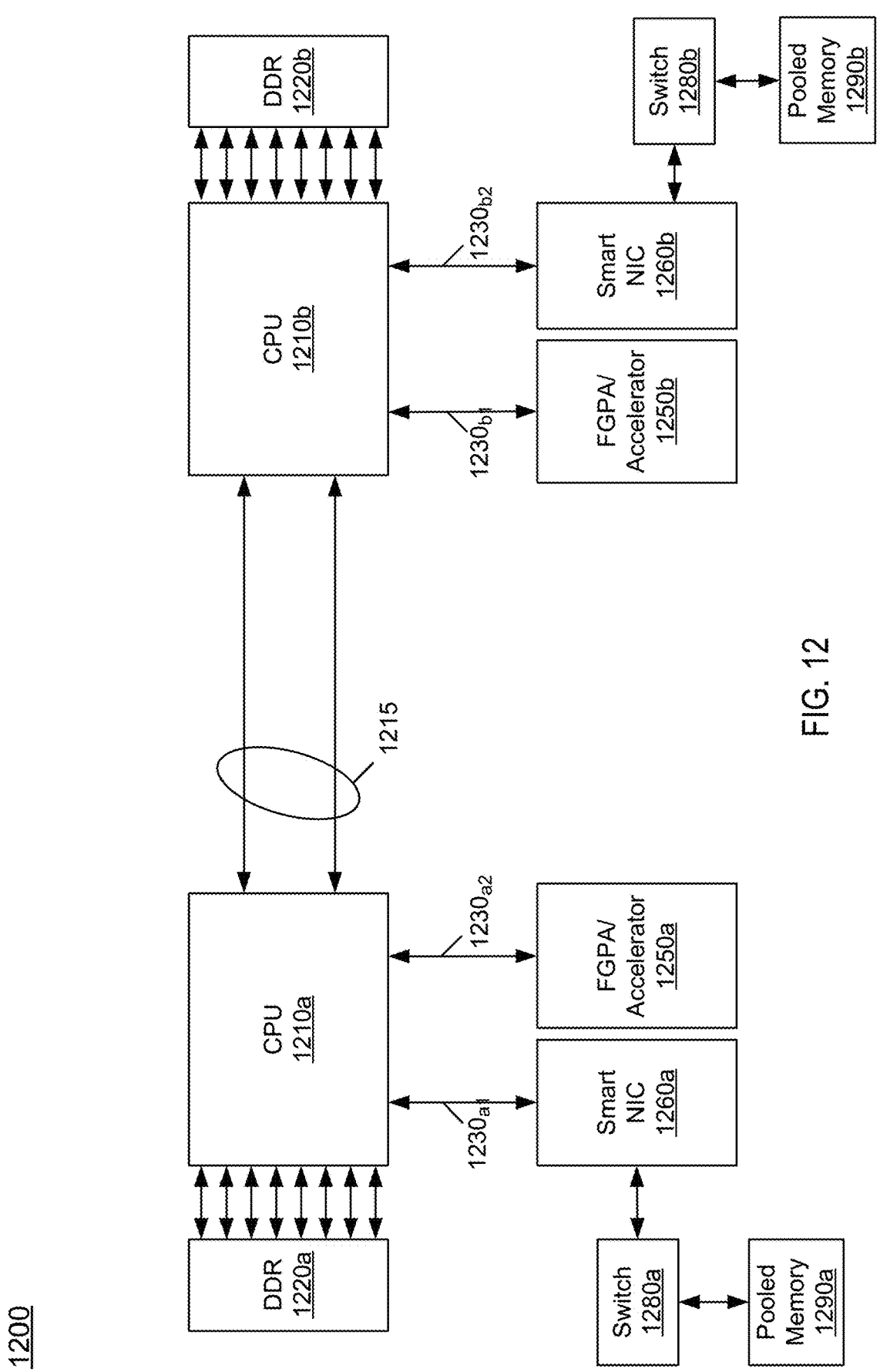
FIG. 12 is a block diagram representation of a system in accordance with an embodiment.

Referring to FIG. 12, a block diagram of a system 1200 in accordance with an embodiment is shown. The system 1200 may be any type of computing device, and in one embodiment may be a server system such as an edge platform. The system 1200 includes multiple CPUs 1210a, 1210b that in turn couple to respective system memories 1220a, 1220b which in embodiments may be implemented as double data rate (DDR) memory. Note that CPUs 1210 may couple together via an interconnect system 1215, which in an embodiment can be an optical interconnect that communicates with optical circuitry (which may be included in or coupled to CPUs 1210) including lasers having waveguides and gratings as described herein.

To enable coherent accelerator devices and/or smart adapter devices to couple to CPUs 1210 by way of potentially multiple communication protocols, a plurality of interconnects 1230a1-b2 may be present. In an embodiment, each interconnect 1230 may be a given instance of a Compute Express Link (CXL) interconnect.

In the embodiment shown, respective CPUs 1210 couple to corresponding field programmable gate arrays (FPGAs)/accelerator devices 1250a, 1250b (which may include graphics processing units (GPUs), in one embodiment. In addition CPUs 1210 also couple to smart network interface circuit (NIC) devices 1260a, 1260b. In turn, smart NIC devices 1260a, 1260b couple to switches 1280a, 1280b that in turn couple to a pooled memory 1290a, 1290b such as a persistent memory.

The following examples pertain to further embodiments.

In one example, an apparatus includes: a processor to generate a first electrical signal comprising first data and a second electrical signal comprising second data; a laser to generate a multiplexed carrier signal comprising a first carrier signal and a second carrier signal, the laser circuit to operate at a first laser power setting; and a modulator coupled to the processor and the laser, the modulator to generate a multiplexed optical signal comprising a first optical signal based in part on the first electrical signal and the first carrier signal and a second optical signal based in part on the second electrical signal and the second carrier signal, the apparatus to transmit the multiplexed optical signal to a device and to retransmit the first data to the device based on detection of error in a received version of the first data at the device.

In an example, the apparatus is to receive a retransmission request for the first data from the device based on the detection of error in the received version of the first data at the device.

In an example, the first laser power setting is associated with a first error probability associated with transmission of data from the apparatus to the device and the error in the received version of the first data is detected following performance of error correction on the received version of the first data in accordance with the first probability.

In an example, the first error probability associated with the transmission of data from the apparatus to the device is higher than a target error probability associated with the transmission of data from the apparatus to the device.

In an example, the retransmission of the first data to the device based on the detection of error in a received version of the first data at the device at least meets the target error probability.

In an example, the target error probability is associated with the transmission of data from the apparatus to the device at a second laser power setting of the laser, the second laser power setting being higher than the first laser power setting.

In an example, the target error probability cannot be met at any laser power setting of the laser without the retransmission of the first data to the device.

In an example, the apparatus is to receive an acknowledgement associated with the second data from the device, the acknowledgement based on detection of no error in a received version of the second data.

In one example, a machine-readable medium includes instructions stored thereon, which if performed by a machine, cause the machine to: receive, at a first device, a multiplexed optical signal comprising a first optical signal based in part on a first carrier signal and a first electrical signal comprising first data and a second optical signal based in part on a second carrier signal and a second electrical signal comprising second data from a second device, the first and second carrier signals generated by a laser operating at a first laser power setting at the second device and the first and second electrical signals generated by a processor at the second device; perform error correction on a received version of the first data based in part on the received version of the first optical signal in accordance with a first error probability associated with transmission of data from the second device to the first device at the first laser power setting to generate a corrected version of the first data at the first device; detect error in the corrected version of the first data at the first device; and receive a retransmission of the first data from the second device at the first device.

In an example, the machine-readable medium includes instructions to cause the machine to transmit a retransmission request associated with the first data from the first device to the second device.

In an example, the machine-readable medium includes instructions to cause the machine to perform low latency forward error correction (FEC) on the received version of the first data in accordance with the first error probability.

In an example, the machine-readable medium includes instructions to cause the machine to perform error correction on the received version of the first data in accordance with the first error probability, the first error probability being based on a bit error rate (BER) associated with transmission of data from the second device to the first device at the first laser power setting.

In an example, the machine-readable medium includes instructions to cause the machine to at least meet a target error probability by performance of the error correction on the received version of the first data in accordance with the first error probability, the detection of the error in the corrected version of the first data, and the receipt of the retransmission of the first data from the second device at the first device, the target error probability being lower than that first error probability.

In an example, the machine-readable medium includes instructions to cause the machine to at least meet the target error probability, the target error probability being associated with the transmission of data from second device to the first device at a second laser power setting of the laser, the second laser power setting being higher than the first laser power setting.

In an example, the machine-readable medium includes instructions to cause the machine to at least meet the target error probability, wherein the target error probability associated with the transmission of data from the second device to the first device cannot be met at any laser power setting of the laser without the retransmission of the first data.

In an example, the machine-readable medium includes instructions to cause the machine to: generate, at the first device, a received version of the first electrical signal based on the received version of the first optical signal; and perform error correction on the received version of the electrical signal in accordance with the first error probability at the first device to generate a corrected version of the first electrical signal, wherein the detection of the error in the corrected version of the first data comprises detection of error in the corrected version of the first electrical signal at the first device.

In an example, the machine-readable medium includes instructions to cause the machine to: perform error correction on a received version of the second data based on the received version of the second optical signal in accordance with the first error probability to generate a corrected version of the second data at the first device; detect no error in the corrected version of the second data at the first device; and use the corrected version of the second data at the first device.

In one example, a system includes: a first device including: a first processor to generate a first electrical signal comprising first data and a second electrical signal comprising second data; a laser to generate a multiplexed carrier signal comprising a first carrier signal and a second carrier signal, the laser to operate at a first laser power setting associated with a first error probability associated with transmission of data from the first device to a second device, the first error probability being greater than a target error probability; and a modulator coupled to the processor and the laser, the modulator to generate a multiplexed optical signal comprising a first optical signal based in part on the first electrical signal and the first carrier signal and a second optical signal based in part on the second electrical signal and the second carrier signal, the first device to transmit the multiplexed optical signal to the second device; and the second device optically coupled to the first device, the second device to receive the multiplexed optical signal and including: a second processor; an add drop filter to generate a received version of first electrical signal based on a received version of the first optical signal; and an error manager coupled to the add drop filter and the second processor, the error manager to perform error correction on the received version of the first electrical signal accordance with the first error probability to generate a corrected version of the first electrical signal at the second device.

In an example, the error manager is to detect error in the corrected version of the first electrical signal, the second processor is to transmit a retransmission request associated with the first data to the first device, and the first device is to retransmit the first data to the second device.

In an example, the second device is to use the corrected version of the first electrical signal including the first data.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus, comprising:
a processor to generate a first electrical signal comprising first data and a second electrical signal comprising second data;
a laser to generate a multiplexed carrier signal comprising a first carrier signal and a second carrier signal, the laser to operate at a first laser power setting; and
a modulator coupled to the processor and the laser, the modulator to generate a multiplexed optical signal comprising a first optical signal based in part on the first electrical signal and the first carrier signal and a second optical signal based in part on the second electrical signal and the second carrier signal, the apparatus to transmit the multiplexed optical signal to a device and to retransmit the first data to the device based on detection of error in a received version of the first data at the device, wherein the first laser power setting is associated with a first error probability associated with transmission of data from the apparatus to the device and the error in the received version of the first data is detected following performance of error correction on the received version of the first data in accordance with the first error probability.

2. The apparatus of claim 1, wherein the apparatus is to receive a retransmission request for the first data from the device based on the detection of error in the received version of the first data at the device.

3. The apparatus of claim 1, wherein the first error probability associated with the transmission of data from the apparatus to the device is higher than a target error probability associated with the transmission of data from the apparatus to the device.

4. The apparatus of claim 3, wherein a retransmission of the first data to the device based on the detection of error in the received version of the first data at the device at least meets the target error probability.

5. The apparatus of claim 4, wherein the target error probability is associated with the transmission of data from the apparatus to the device at a second laser power setting of the laser, the second laser power setting being higher than the first laser power setting.

6. The apparatus of claim 4, wherein the target error probability cannot be met at any laser power setting of the laser without the retransmission of the first data to the device.

7. The apparatus of claim 1, to receive an acknowledgement associated with the second data from the device, the acknowledgement based on detection of no error in a received version of the second data.

8. A non-transitory machine-readable medium comprising instructions stored thereon, which if performed by a machine, cause the machine to:
receive, at a first device, a multiplexed optical signal comprising a first optical signal based in part on a first carrier signal and a first electrical signal comprising first data and a second optical signal based in part on a second carrier signal and a second electrical signal comprising second data from a second device, the first and second carrier signals generated by a laser operating at a first laser power setting at the second device and the first and second electrical signals generated by a processor at the second device;
perform error correction on a received version of the first data based in part on the received version of the first optical signal in accordance with a first error probability associated with transmission of data from the second device to the first device at the first laser power setting to generate a corrected version of the first data at the first device;
detect error in the corrected version of the first data at the first device; and
receive a retransmission of the first data from the second device at the first device.

9. The non-transitory machine-readable medium of claim 8, further comprising instructions to cause the machine to transmit a retransmission request associated with the first data from the first device to the second device.

10. The non-transitory machine-readable medium of claim 8, further comprising instructions to cause the machine to perform low latency forward error correction (FEC) on the received version of the first data in accordance with the first error probability.

11. The non-transitory machine-readable medium of claim 8, further comprising instructions to cause the machine to perform error correction on the received version of the first data in accordance with the first error probability, the first error probability being based on a bit error rate (BER) associated with transmission of data from the second device to the first device at the first laser power setting.

12. The non-transitory machine-readable medium of claim 8, further comprising instructions to cause the machine to at least meet a target error probability by performance of the error correction on the received version of the first data in accordance with the first error probability, the detection of the error in the corrected version of the first data, and the receipt of the retransmission of the first data from the second device at the first device, the target error probability being lower than that first error probability.

13. The non-transitory machine-readable medium of claim 12, further comprising instructions to cause the machine to at least meet the target error probability, the target error probability being associated with the transmission of data from second device to the first device at a second laser power setting of the laser, the second laser power setting being higher than the first laser power setting.

14. The non-transitory machine-readable medium of claim 12, further comprising instructions to cause the machine to at least meet the target error probability, wherein the target error probability associated with the transmission of data from the second device to the first device cannot be met at any laser power setting of the laser without the retransmission of the first data.

15. The non-transitory machine-readable medium of claim 8, further comprising instructions to cause the machine to:

generate, at the first device, a received version of the first electrical signal based on the received version of the first optical signal; and perform error correction on the received version of the electrical signal in accordance with the first error probability at the first device to generate a corrected version of the first electrical signal, wherein the detection of the error in the corrected version of the first data comprises detection of error in the corrected version of the first electrical signal at the first device.

16. The non-transitory machine-readable medium of claim 8, further comprising instructions to cause the machine to:

perform error correction on a received version of the second data based on the received version of the second optical signal in accordance with the first error probability to generate a corrected version of the second data at the first device;

detect no error in the corrected version of the second data at the first device; and use the corrected version of the second data at the first device.

17. A system, comprising:

a first device comprising:

a first processor to generate a first electrical signal comprising first data and a second electrical signal comprising second data;

a laser to generate a multiplexed carrier signal comprising a first carrier signal and a second carrier signal, the laser to operate at a first laser power setting associated with a first error probability associated with transmission of data from the first device to a second device, the first error probability being greater than a target error probability; and a modulator coupled to the processor and the laser, the modulator to generate a multiplexed optical signal comprising a first optical signal based in part on the first electrical signal and the first carrier signal and a second optical signal based in part on the second electrical signal and the second carrier signal, the first device to transmit the multiplexed optical signal to the second device; and the second device optically coupled to the first device, the second device to receive the multiplexed optical signal and comprising:

a second processor;

an add drop filter to generate a received version of the first electrical signal based on a received version of the first optical signal; and an error manager coupled to the add drop filter and the second processor, the error manager to perform error correction on the received version of the first electrical signal in accordance with the first error probability to generate a corrected version of the first electrical signal at the second device.

18. The system of claim 17, wherein the error manager is to detect error in the corrected version of the first electrical signal, the second processor is to transmit a retransmission request associated with the first data to the first device, and the first device is to retransmit the first data to the second device.

19. The system of claim 18, wherein the second device is to use the corrected version of the first electrical signal including the first data.

20. The system of claim 17, wherein the target error probability is associated with transmission of data at a second laser power setting of the laser, the second laser power setting being higher than the first laser power setting.

* * * * *